017
United States Patent [19]

Kishida et al.

[11] Patent Number: 4,526,929
[45] Date of Patent: Jul. 2, 1985

[54] RESIN COMPOSITION USABLE WITHOUT BEING COATED

[75] Inventors: Kazuo Kishida, Ohtake; Akira Hasegawa, Hiroshima; Yasunori Kawachi, Ohtake; Hiroshi Kawasaki; Hiroshi Mizukoshi, both of Yokohama, all of Japan

[73] Assignee: Mitsubishi Rayon Company, Limited, Tokyo, Japan

[21] Appl. No.: 284,668

[22] Filed: Jul. 20, 1981

[30] Foreign Application Priority Data

Aug. 13, 1980 [JP] Japan .................. 55-111181

[51] Int. Cl.³ .............. C08L 31/02; C08L 33/08; C08L 33/10; C08L 51/08
[52] U.S. Cl. ......................... 525/80; 525/85; 525/902
[58] Field of Search ............... 525/80, 85, 902

[56] References Cited

U.S. PATENT DOCUMENTS

| | | | |
|---|---|---|---|
| 3,661,994 | 5/1972 | Hwa et al. ............... | 525/902 |
| 3,793,402 | 2/1974 | Owens ..................... | 525/80 |
| 3,830,878 | 8/1974 | Kato et al. ............... | 525/80 |
| 4,108,946 | 8/1978 | Kamada et al. | |
| 4,173,596 | 11/1979 | DeWitt .................... | 525/85 |
| 4,197,376 | 4/1980 | Lee et al. ................ | 525/80 |
| 4,351,921 | 9/1982 | Kishida et al. ........... | 525/80 |

FOREIGN PATENT DOCUMENTS

| | | | |
|---|---|---|---|
| 2324316 | 1/1974 | Fed. Rep. of Germany ...... | 525/902 |
| 23341 | 7/1973 | Japan ..................... | 525/902 |

Primary Examiner—Melvyn I. Marquis
Assistant Examiner—Robert E. L. Sellers
Attorney, Agent, or Firm—Oblon, Fisher, Spivak, McClelland & Maier

[57] ABSTRACT

Disclosed is a resin composition which is usable for an exterior article without being coated on its surface when molded into the article and is excellent in the color tone and has good impact resistance and weatherability, said composition comprising (I) 10 to 70% by weight of a high-rubber-content graft polymer obtained by polymerizing 50 to 10% by weight of a monomer mixture (C) comprising 10 to 90% by weight of at least one aromatic vinyl monomer and 90 to 10% by weight of at least one ethylenically unsaturated monomer represented by the following general formula:

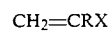

wherein R stands for a hydrogen atom or methyl group, and X stands for a group —CN or —COOR₁ in which R₁ stands for an alkyl group having 1 to 8 carbon atoms, in the presence of a latex of a multi-layer crosslinked acrylic rubber particles containing 5 to 30% by weight of a rigid crosslinked resin (A) having a core particle size of 0.15 to 0.40μ in the interior of the rubber particles and 45 to 85% by weight of a crosslinked acrylic acid ester polymer (B) comprising an acrylic acid ester as the main component in the outer layer of the rubber particles, so that the total amount of the components (A), (B) and (C) is 100% by weight, (II) 90 to 30% by weight of a thermoplastic resin obtained by polymerizing at least one alkyl acrylate or methacrylate represented by the following general formula:

wherein R stands for a hydrogen atom or methyl group, and R₁ stands for an alkyl group having 1 to 8 carbon atoms, in an amount of at least 90% by weight, and (III) 0 to 50% by weight of a diene type rubber-containing thermoplastic resin, the sum of the amounts of the components (I), (II) and (III) being 100% by weight.

15 Claims, 3 Drawing Figures

RESIN COMPOSITION USABLE WITHOUT BEING COATED

BACKGROUND OF THE INVENTION

1. Field of the Invention

The present invention relates to a resin composition which is usable for an exterior article without being coated on its surface when molded into the article and has an excellent color tone and good impact resistance and weatherability.

2. Description of the Prior Art

An impact resistance has heretofore been given to rigid resins by reinforcing them by elastomers. An ABS resin is a typical instance of the reinforced resin of this type, but since a diene type rubber is used as the elastomer component, the weatherability is poor and outdoor use of this resin is restricted. This defect can be moderated to some extent by addition of an ultraviolet absorber or antioxidant, but a significant improvement of the poor weatherability of the ABS resin cannot be attained by incorporation of such additive. Accordingly, at present, the weatherability of the ABS resin is improved by forming a plating or coating layer on the surface of the ABS resin so that the ABS resin can be used outdoors. However, the surface treatment of the ABS resin comprises many steps and a problem of environmental polution readily arise. Accordingly, development of thermoplastic resin composition which can retain excellent appearance, impact resistance and weatherability without formation of a plating or coating layer even if they are used outdoors for a long time has been desired in various fields where outdoor application is indispensable, for example, in the fields of automobiles and outdoor electric devices.

Various methods where a saturated rubber is used as the elastomer have been proposed as means satisfying the above desire. For example, an acrylic ester type rubber has been used, and many examinations have been made on this rubber. However, the acrylic ester type rubber is disadvantageous in that the speed of elastic recovery is lower than that of the diene type rubber. Accordingly, if a resin composition comprising such rubber and a rigid resin is subjected to injection molding, orientation of rubber particles is conspicuous and a pearl-like pattern is formed with the vicinity of the gate of a molded article being as the center, resulting in reduction of the appearance characteristic and decrease of the commercial value.

We made researches on formation of a pearl-like pattern which is caused by using an acrylic ester type rubber and found that if a cross-linked resin is made present in the interiors of particles of the acrylic ester type rubber, the above defect can be eliminated. We already filed a patent application for an invention based on this finding. Indeed, formation of a pearl-like pattern in the vicinity of the gate of a molded article at the injection molding step can considerably by controlled by this invention. However, as a result of our researches made afterward, it was found that when a colored molded article is prepared by injection molding by using a dye or pigment such as carbon black, color unevenness takes place with the vicinity of the gate being as the center because of an interference effect in a visible ray region which is due to orientation of the dye or pigment at the injection molding step, and this defect cannot be overcome by our previous proposal. If color unevenness takes place at the injection molding step, the color tone of the molded article becomes non-uniform and it is not suitable as an exterior article without being coated on its surface.

SUMMARY OF THE INVENTION

Under such background, we made researches with a view to developing a resin composition in which a plating or coating treatment of the surface of a molded article, as conducted in case of an ABS resin, need not be effected and color unevenness does not take place even when it is molded into a colored molded article, and which can be used outdoors for a long time. We found that this object can be attained by a resin composition which comprises specific amounts of a high-rubber-content graft polymer obtained by graft-polymerizing a multi-layer cross-linked acrylic rubber particles comprising in the interior of particles a specific amount of a rigid crosslinked resin having a specific core particle size, with a mixture of other monomers so that the content of the acrylic rubber is at least 50% and a thermoplastic resin comprising an alkyl acrylate or methacrylate as the main component, which has separately been prepared by suspension polymerization or the like, and which further comprises a specific amount of a diene type-containing thermoplastic resin according to need. We have now completed the present invention based on this finding.

More specifically, in accordance with the present invention, there is provided a resin composition which is usable for an exterior article without being coated on its surface when molded into the article and is excellent in the color tone and has good impact resistance and weatherability, said composition comprising (I) 10 to 70% by weight of a high-rubber-content graft polymer obtained by polymerizing 50 to 10% by weight of a monomer mixture (C) comprising 10 to 90% by weight of at least one aromatic vinyl monomer and 90 to 10% by weight of at least one ethylenically unsaturated monomer represented by the following general formula:

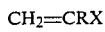

$$CH_2=CRX$$

wherein R stands for a hydrogen atom or methyl group, and X stands for a group —CN or —COOR$_1$ in which R$_1$ stands for an alkyl group having 1 to 8 carbon atoms, in the presence of a latex of a multi-layer crosslinked acrylic rubber particles containing 5 to 30% by weight of a rigid crosslinked resin (A) having a core particle size of 0.15 to 0.40μ in the interior of the rubber particles and 45 to 85% by weight of a crosslinked acrylic acid ester polymer (B) comprising an acrylic acid ester as the main component in the outer layer of the rubber particles, so that the total amount of the components (A), (B) and (C) is 100% by weight, (II) 90 to 30% by weight of a thermoplastic resin obtained by polymerizing at least on alkyl acrylate or methacrylate represented by the following general formula:

$$CH_2=CRCOOR_1$$

wherein R stands for a hydrogen atom or methyl group, and R$_1$ stands for an alkyl group having 1 to 8 carbon atoms, in an amount of at least 90% by weight, and (III) 0 to 50% by weight of a diene type rubber-containing thermoplastic resin, the sum of the amounts of the components (I), (II) and (III) being 100% by weight.

DETAILED DESCRIPTION OF THE INVENTION

Figure 1:
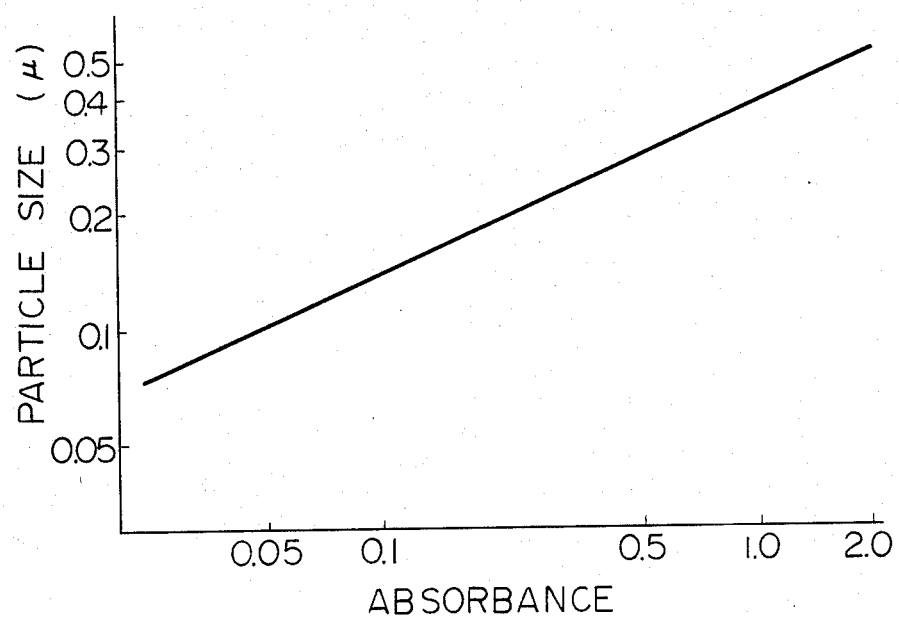
FIG. 1 is a calibration curve illustrating the relation between the particle size of a latex measured by the electron-microscopic method and the absorbance of a dilution of the latex at a wavelength of 700 mμ.

The most characteristic feature of the resin composition of the present invention is that by blending a high-rubber-content graft polymer (I) comprising a crosslinked acrylic acid ester polymer as the main component and containing a rigid crosslinked resin having a specific particle size in the interior of the rubber particles with a thermoplastic resin (II) obtained by using an alkyl acrylate or methacrylate at a ratio exceeding a certain level, the difference of the refractive index between the rubber component of the graft polymer (I) and the thermoplastic resin (II) is reduced and the transparency of the blend polymer is improved, with the result that a resin composition which is highly excellent in the color tone can be obtained. This effect is especially prominent when a dye or pigment such as carbon black is added to the resin composition of the present invention and the mixture is subjected to injection molding. In this case, the fatal defect of the conventional technique, that is, occurrence of color unevenness, is eliminated and a colored molded article showing a deep color can be obtained.

Another characteristic feature of the resin composition of the present invention resides in that by adjusting the particle size of the rigid crosslinked resin (A) formed in the interior of particles of the above-mentioned acrylic type rubber to 0.15 to 0.40μ, the impact strength can remarkably be improved and a resin composition excellent in the surface appearance can be obtained.

The composition comprising the above-mentioned high-rubber-content graft polymer (I) and specific thermoplastic resin (II) alone has the above-mentioned excellent properties. If a diene type rubber-containing thermoplastic resin (III) is incorporated at an appropriate ratio into this composition according to need, the characteristics of both components (I) and (II) are further enhanced. For example, since the acrylic acid ester rubber has a higher glass transition temperature than that of the diene type rubber, the impact resistance of the composition is ordinarily reduced at low temperatures, but this disadvantage can be moderated by incorporation of the diene type rubber.

A resin which is rigid at normal temperatures and is obtained by customary emulsion polymerization can be used as the rigid crosslinked resin (A) forming inner cores of the particles of the multi-layer crosslinked acrylic rubber, but a polymer obtained by crosslinking and polymerizing the graft resin-forming monomer described hereinafter or the same mixture as the mixture (C) is preferably used as the rigid crosslinked resin (A). As the crosslinking agent, there may be used crosslinkable monomers having at least two non-conjugate C=C bonds, for example, polyol-unsaturated acid esters such as ethylene glycol dimethacrylate and butane diol diacrylate; polybasic acid-unsaturated alcohol esters such as triallyl cyanurate and triallyl isocyanurate; divinyl compounds such as divinylbenzene; and unsaturated acid-unsaturated alcohol esters such as allyl methacrylate and diallyl phthalate. The crosslinking agent is used in an amount of 0.01 to 3% by weight, preferably 0.1 to 2% by weight. If the amount used of the crosslinking agent is smaller than 0.01% by weight, defects appear on the surface of the final molded article, and if the amount used of the crosslinking agent is larger than 3% by weight, the flowability and impact strength are reduced and no good results can be obtained.

In the present invention, it is important that in preparing this rigid crosslinked resin, the particle size of the crosslinked resin latex should be controlled to 0.15 to 0.40μ. If the particle size of the cores of the rubber particles is within this range, the impact resistance can remarkably be enhanced.

As the acrylic acid ester forming the main component of the crosslinked acrylic acid ester polymer (B) constituting the outer layer portion of the rubber particles, there may be used esters of alkyl groups having 1 to 12 carbon atoms, such as methyl, ethyl, n-propyl, n-butyl, 2-ethylhexyl and n-lauryl groups, and aromatic esters such as benzyl acrylate and phenetyl acrylate. In order to maintain a rubbery state at normal temperatures, it is indispensable that an acrylic acid ester, preferably an alkyl ester having 1 to 8 carbon atoms in the alkyl group, should be used in an amount of at least 60% by weight of the constituent monomers of the crosslinked acrylic acid ester polymer (B). As the monomer copolymerizable with such acrylic acid ester, there can be mentioned, for example, methacrylic acid esters such as methyl methacrylate and n-butyl methacrylate; and acrylonitrile and styrene. Such acrylic acid ester type rubber is ordinarily required to have a crosslinked three-dimensional structure, and also in the present invention, it is indispensable that a crosslinked three-dimensional structure should be formed in the acrylic acid ester type rubber. Crosslinking agents described hereinbefore with reference to the rigid crosslinked resin (A) may be used for formation of such crosslinked structure. For example, there may be adopted a method in which such crosslinking agent is mixed with the above-mentioned acrylic ester or a monomer mixture comprising the above-mentioned acrylic ester as the main component and the mixture is polymerized and a method in which after polymerization, an organic peroxide such as benzoyl peroxide is added and the rubber is heated in the latex state. Both methods may be adopted in combination.

In practically carrying out the present invention, for the preparation of the multi-layer crosslinked acrylic type rubber, there is ordinarily adopted a so-called seed polymerization method in which 45 to 85% by weight of a mixture (B) of the above-mentioned acrylic acid ester or a monomer mixture comprising the above-mentioned acrylic acid ester as the main component and the above-mentioned crosslinking agent is polymerized in the presence of 5 to 30% by weight (as the solids) of the above-mentioned rigid crosslinked resin latex (A) having a particle size of 0.15 to 0.40μ under such conditions that formation of new particles is controlled. There may be adopted a post-crosslinking method in which after polymerization of the above-mentioned monomer or monomer mixture, an organic peroxide is added so that the sum of the monomer and crosslinking agent used is 45 to 85% by weight and heating is conducted in the latex state. From the viewpoint of physical properties, it is preferred that in the multi-layer crosslinked acrylic type rubber, the degree of swelling be 5 to 15 and the gel content be about 85 to about 95%. The amount of the crosslinking agent used at the seed polymerization or post crosslinking is determined so that the degree of swelling and gel content are within the above-mentioned ranges. Ordinarily, the crosslinking agent is used in an amount of 0.1 to 10% by weight. The degree of swelling and gel content of the multi-layer crosslinked acrylic type rubber are determined according to the following method.

A film is prepared from a latex and the film is dipped in methylethyl ketone at 38° C. for 48 hours. The degree of swelling is calculated according to the formula $W_1/W_2$ in which $W_1$ stands for the weight of the film after swelling and $W_2$ stands for the weight of the absolute dry film after swelling, and the gel content is calculated according to the formula $W_2/W_0 \times 100$ in which $W_2$ is as defined above and $W_0$ stands for the weight of the film before dipping.

In the presence of the so-formed multi-layer crosslinked acrylic type rubber latex, 50 to 10% by weight of the resin-forming monomer mixture (C) comprising 10 to 90% by weight of at least one aromatic vinyl monomer and 90 to 10% by weight of at least one ethylenically unsaturated monomer represented by the above-mentioned general formula $CH_2=CRX$ is polymerized so that the sum of the amounts of the rigid crosslinked resin (A), crosslinked acrylic acid ester polymer (B) and resin-forming monomer mixture (C) is 100% by weight. Graft polymerization is carried out by adding all the monomer components to the latex simultaneously or in a divided manner or a continuous manner in the presence of a radical forming initiator to obtain a graft polymer (I). In this case, there may be adopted a method in which the grafting ratio or degree of polymerization is variously changed to make the resin portion graft-bonded in multi-stage, or an emulsion-suspension method in which the emulsion phase is converted to a suspension phase at the graft polymerization step. By multi-stage graft polymerization, the impact resistance and flowability of the resin composition can further be improved.

As the aromatic vinyl monomer, there may be used styrene and α-methylstyrene, and as the compound represented by the general formula $CH_2=CRX$, there may be used acrylonitrile, methacrylonitrile, methyl acrylate, ethyl acrylate, propyl acrylate, butyl acrylate, methyl methacrylate, ethyl methacrylate, propyl methacrylate and butyl methacrylate.

In the present invention, it is preferred that the ratio of grafting of the graft resin portion (C) to the multi-layer crosslinked acrylic rubber composed of the above-mentioned components (A) and (B) is at least 10%. The grafting ratio referred to herein is determined according to the following method.

A certain weight $W_3$ of the graft polymer is directly refluxed in acetone at 70° C. for 2 hours, and the insoluble portion is collected by centrifugal separation and the weight $W_4$ after absolute drying is measured. The grafting ratio is calculated according to the following formula:

$$\frac{(W_4 - W_5)}{W_5} \times 100$$

wherein $W_5$ stands for the weight of the multi-layer crosslinked acrylic rubber in the graft polymer $W_3$.

It is one of the characteristic features of the present invention that the proportion of the multi-layer crosslinked acrylic rubber in the so-obtained graft polymer (I) is adjusted to 50 to 90% by weight. By virtue of this characteristic feature of the present invention, there can be obtained a resin composition which is usable for an exterior article without being coated on its surface when molded into the article and have various excellent properties can be obtained.

A molding material is formed by mixing 10 to 70% by weight of the so-prepared high-rubber-content graft polymer (I) based on the total amount of resin composition with 90 to 30% by weight of the separately prepared specific thermoplastic resin (II) based on the total amount of resin composition. The specific thermoplastic resin (II) is obtained by polymerizing at least 90% by weight of an alkyl acrylate or methacrylate represented by the above general formula $CH_2=CRCOOR_1$. As this specific thermoplastic resin (II), there can be mentioned, for example, a methyl methacrylate/butyl methacrylate copolymer and a methyl methacrylate/methyl acrylate copolymer. This polymer may comprise up to 10% by weight an aromatic vinyl compound or cyano type vinyl compound as the comonomer. The polymerization method for formation of the thermoplastic resin (II) is not particularly limited. However, from the viewpoint of physical properties such as hardness and gloss, it is preferred that a polymer prepared by suspension polymerization or bulk polymerization be used as the thermoplastic resin (II).

The resin composition of the present invention may be used in the form of a blend comprising the graft polymer (I) and specific thermoplastic resin (II). However, in the present invention, according to need, a diene type rubber-containing thermoplastic resin (III) having a diene type rubber content of at least 10% by weight is incorporated in an amount of 0 to 50% by weight so that the sum of the amounts of the components (I), (II) and (III) is 100% by weight. As the diene type rubber, there can be mentioned, for example, polybutadiene, a butadiene/styrene copolymer and a butadiene/acrylonitrile copolymer. As a typical instance of the diene type rubber-containing thermoplastic resin, there can be mentioned an ABS resin.

Various dyes or pigments, light or heat stabilizers, inorganic or organic, granular, powdery or fibrous fillers and blowing agents may be added to the resin composition of the present invention according to the intended objects.

The resin composition according to the present invention may be molded into various molded articles excellent in the weatherability, impact resistance and color tone by injection molding, extrusion molding or the like, and these molded articles are effectively used especially on the fields of automobiles and outdoor electric devices. Furthermore, the resin composition of the present invention can be utilized as a constituent element of a laminate structure, for example, an outermost layer material.

The present invention will now be described in detail with reference to the following Examples that by no means limit the scope of the present invention.

In these Examples, all of "%" and "parts" are by weight. The particle size of a formed latex was determined by forming a calibration curve from the relation between a particle size of an uncrosslinked resin latex comprising 20% by weight of methyl methacrylate, 20% by weight of acrylonitrile and 60% by weight of styrene, which was measured by the electron-microscopic method, and the absorbance of a dilution (0.5 g/l) of this latex at a wavelength of 700 mμ, measuring the absorbance of the formed latex and reading the corresponding particle size from this calibration curve. This calibration curve is shown in FIG. 1.

EXAMPLE 1

(A) Preparation of Crosslinked Resin Latex

A reaction vessel was charged with 200 parts of deionized water, and the inner atmosphere was replaced by nitrogen and the inner temperature was elevated to 80° C. Then, 0.06 part of potassium persulfate was added and a mixture comprising the following components was continuously poured into the reaction vessel over a period of 30 minutes.
Methyl methacrylate (MMA): 2 parts
Acrylonitrile (AN): 2 parts
Styrene (St): 6 parts
Triallyl isocyanurate (TAIC): 0.05 part
Pelex OTP (dioctyl sulfosuccinate type emulsifier supplied by Kao-Atlas K.K.): 0.25 part When about 1 hour had passed from the point of completion of pouring of the above mixture, exothermic reaction ended. The particle size of the obtained crosslinked resin latex was 0.31μ.

(B) Preparation of Multi-Layer Crosslinked Acrylic Rubber

To the crosslinked resin latex obtained in (A) above was added 0.24 part of potassium persulfate, and a mixture comprising the following components was continuously poured in the resin latex over a period of 2 hours.
n-Butyl acrylate (BuA): 45 parts
AN: 5 parts
TAIC: 0.25 part
Pelex OTP: 0.30 part The so-obtained crosslinked acrylic rubber comprising the crosslinked resin as the core had a swelling degree of 6.7, a gel content of 90% and a particle size of 0.33μ.

(C) Preparation of Graft Polymer

Then, a mixture comprising the following components was continuously poured into the crosslinked acrylic rubber latex obtained in (B) above over a period of 2 hours.
MMA: 8 parts
AN: 8 parts
St: 24 parts
n-Octylmercaptan: 0.04 part
Benzoyl peroxide: 0.20 part The so-obtained latex was thrown into an aqueous solution of calcium chloride in an amount of 5 times the amount of the latex with stirring to effect coagulation. The liquid was removed from the coagulation product, and the coagulation product was then washed and dried to obtain a high-rubber-content graft polymer.

(D) Blending and Evaluation of Physical Properties

Then, 50 parts of the graft polymer obtained in (C) above was blended with 50 parts of suspension particles prepared separately from a monomer mixture comprising 90% of MMA and 10% of MA to obtain a resin composition in which the content of the multi-layer crosslinked acrylic rubber was 30%. Then, 1 part of barium stearate and 0.1 part of Tinuvin P (ultraviolet absorbent supplied by CIBA-GEIGY Limited) were added to the resin composition, and the mixture was pelletized by an extruder. Test pieces were prepared from the obtained pellets by injection molding, and physical properties of the test pieces were evaluated. The obtained results are shown in Table 1. In Table 1, the values of the notched Izod impact strength are those determined according to the method of ASTM D-256 (in the subsequent Examples and Comparative Examples, the values of the notched impact strength determined according to this method are shown). The degree of swelling and gel content of the crosslinked acrylic rubber were determined according to the methods described hereinbefore.

EXAMPLE 2 AND COMPARATIVE EXAMPLES 1 AND 2

Crosslinked resin latexes differing in the particle size were prepared at the operation (A) of Example 1, and the operations (B), (C) and (D) were conducted in the same manner as described in Example 1 and physical properties were similarly evaluated. The obtained results are shown in Table 1.

TABLE 1

|  | Example 1 | Example 2 | Comparative Example 1 | Comparative Example 2 |
|---|---|---|---|---|
| Particle Size (μ) of Crosslinked Resin Latex | 0.31 | 0.24 | 0.12 | 0.08 |
| Particle Size (μ) of Crosslinked Acrylic Rubber | 0.33 | 0.29 | 0.16 | 0.10 |
| Degree of Swelling | 6.7 | 6.0 | 7.4 | 12.0 |
| Gel Content (%) | 90 | 90 | 89 | 89 |
| Notched Izod Impact Strength(Kg-cm/cm$^2$) | 14 | 11 | 4 | 2 |

EXAMPLE 3 THROUGH 5

The operations (A), (B), (C) and (D) of Example 1 were repeated in the same manner except that the monomer components and the amounts used thereof were changed as shown in Table 2, and physical properties were evaluated in the same manner as described in Example 1. The obtained results are shown in Table 2. In Table 2, TAC represents triallyl cyanurate.

| Example No. | Monomer Composition (parts) of Crosslinked Resin Latex | Monomer Composition (parts) of Crosslinked Acrylic Rubber | Monomer Composition (parts) of Grafted Portion | Particle Size (μ) of Crosslinked Resin Latex | Partical Size (μ) of Crosslinked Acrylic Rubber | Degree of swelling | Gel Content (%) | Notched Izod Impact Strength (kg-cm/cm$^2$) |
|---|---|---|---|---|---|---|---|---|
| 3 | MMA/AN/St/TAC = 2/2/6/0.05 | BuA/AN/TAC = 45/5/0.25 | MMA/AN/St = 8/8/24 | 0.31 | 0.33 | 6.9 | 90 | 12 |
| 4 | MMA/AN/St/TAC = 2/2/6/0.05 | BuA/An/TAC = 45/5/0.25 | AN/St = 10/30 | 0.30 | 0.32 | 6.7 | 90 | 13 |
| 5 | AN/St/TAC = | BuA/AN/TAC = | AN/St = | 0.32 | 0.34 | 6.7 | 90 | 16 |

| Example No. | Monomer Composition (parts) of Crosslinked Resin Latex | Monomer Composition (parts) of Crosslinked Acrylic Rubber | Monomer Composition (parts) of Grafted Portion | Particle Size (μ) of Crosslinked Resin Latex | Partical Size (μ) of Crosslinked Acrylic Rubber | Degree of swelling | Gel Content (%) | Notched Izod Impact Strength (kg-cm/cm²) |
|---|---|---|---|---|---|---|---|---|
| | 2.5/7.5/0.05 | 45/5/0.25 | 10/30 | | | | | |

EXAMPLE 6

Test pieces were prepared in the same manner as described in Example 1 except that 0.4 part of carbon black was added at the pelletizing step. The color tone of the test pieces was evaluated, and the scattered light intensity was measured by a three-dimensional glossmeter according to the following method.

Figure 2:
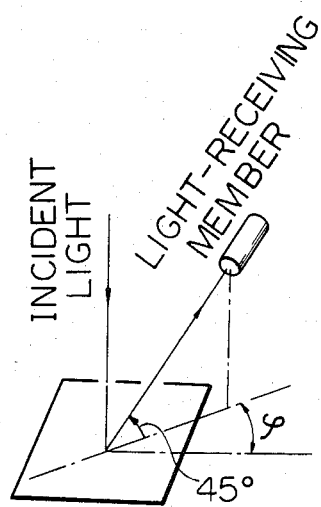
FIG. 2 is a diagram illustrating the method of measuring the intensity of scattered light.

As shown in FIG. 2, white light was incident on a test piece vertically thereto, and the intensity of the light scattered in a direction of 45° was measured while rotating the test piece with the incident point being as the center.

Figure 3:
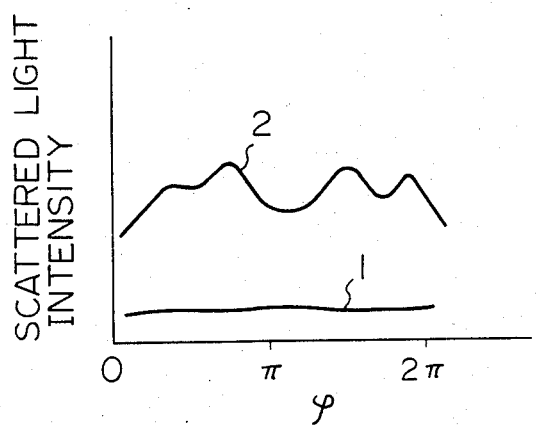
FIG. 3 is a scattered light intensity curve.

The obtained intensity curve is shown in FIG. 3 (curve 1). The ratio of the maximum intensity to the minimum intensity ($I_{max}/I_{min}$) was 1.2 and the color tone was good.

Incidentally, with increase of the value of this intensity ratio, reflection unevenness is increased and the color tone tends to degrade.

COMPARATIVE EXAMPLE 3

Test pieces were prepared in the same manner as described in Example 6 except that a polymer comprising 25 parts of AN and 75 parts of St was used as the thermoplastic resin to be blended. In the test pieces, reflection unevenness was observed with the vicinity of the gate being as the center, and the color tone was not good. The scattered light intensity was measured in the same manner as described in Example 6 to obtain an intensity curve 2 shown in FIG. 3. The $I_{max}/I_{min}$ value was 1.7.

EXAMPLE 7

A resin composition comprising 35 parts of the high-rubber-content graft polymer obtained in Example 1, 50 parts of suspension copolymer particles formed from a mixture comprising 90% of MMA and 10% of MA and 15 parts of an ABS resin having a butadiene rubber content of 20% by weight was prepared and test pieces were formed therefrom in the same manner as described in (D) of Example 1. The notched Izod impact strength was 20 Kg-cm/cm² and the obtained test pieces were excellent in the appearance and color tone.

What is claimed is:

1. A resin composition which is usable for an exterior article without being coated on its surface when molded into the article and is excellent in the color tone and has good impact resistance and weatherability, said composition comprising (I) 10 to 70% by weight of a high-rubber-content graft polymer obtained by polymerizing 50 to 10% by weight of a monomer mixture (C) comprising 10 to 90% by weight of at least one aromatic vinyl monomer and 90 to 10% by weight of at least one ethylenically unsaturated monomer represented by the following general formula:

$$CH_2=CRX$$

wherein R stands for a hydrogen atom or methyl group, and X stands for a group —CN or —$COOR_1$ in which $R_1$ stands for an alkyl group having 1 to 8 carbon atoms, in the presence of a latex of multi-layer crosslinked acrylic rubber particles containing 5 to 30% by weight of a rigid crosslinked resin (A) having a core particle size of 0.30 to 0.40μ in the interior of the rubber particles and 45 to 85% by weight of a crosslinked acrylic acid ester polymer (B) comprising an acrylic acid ester as the main component in the outer layer of the rubber particles, so that the total amount of the components (A), (B) and (C) is 100% by weight, (II) 90 to 30% by weight of a thermoplastic resin obtained by polymerizing at least one alkyl acrylate or methacrylate represented by the following general formula:

$$CH_2=CRCOOR_1$$

wherein R stands for a hydrogen atom or methyl group, and $R_1$ stands for an alkyl group having 1 to 8 carbon atoms, in an amount of at least 90% by weight, and (III) 0 to 50% by weight of a diene type rubber-containing thermoplastic resin, the sum of the amounts of the components (I), (II) and (III) being 100% by weight.

2. The resin composition as set forth in claim 1, wherein a crosslinking monomer having at least two non-conjugate C═C bonds is used in an amount of 0.01 to 3% by weight based on the component (A) for formation of the component (A).

3. The resin composition as set forth in claim 1, wherein the acrylic acid ester used as the main component of the component (B) is an alkyl ester of acrylic acid having 1 to 12 carbon atoms in the alkyl group or an aromatic ester of acrylic acid.

4. The resin composition as set forth in claim 1, wherein the component (B) comprises at least 60% by weight of an acrylic acid ester and up to 40 by weight of a monomer copolymerizable therewith.

5. The resin composition as set forth in claim 4, wherein the copolymerizable monomer is a methacrylic acid ester, acrylonitrile or styrene.

6. The resin composition as set forth in claim 1, wherein a crosslinking monomer having at least two non-conjugate C═C bonds is used for formation of the component (B).

7. The resin composition as set forth in claim 1, wherein the multi-layer crosslinked acrylic rubber has a degree of swelling of 5 to 15 and a gel content of 85 to 95%.

8. The resin composition as set forth in claim 1, wherein the aromatic vinyl monomer is styrene or α-methylstyrene.

9. The resin composition as set forth in claim 1, wherein the ethylenically unsaturated monomer of the formula $CH_2=CRX$ is acrylonitrile, methacrylonitrile, methyl acrylate, ethyl acrylate, propyl acrylate, butyl acrylate, methyl methacrylate, ethyl methacrylate, propyl methacrylate or butyl methacrylate.

10. The resin composition as set forth in claim 1, wherein the ratio of component (C) to the multi-layer crosslinked acrylic rubber during grafting is at least 10%.

11. The resin composition as set forth in claim 1, wherein the thermoplastic resin (II) is a methyl methacrylate/butyl methacrylate copolymer or methyl methacrylate/methyl acrylate copolymer.

12. The resin composition as set forth in claim 1, wherein the thermoplastic resin (II) comprises up to 10% by weight of an aromatic vinyl compound or a cyano type vinyl compound.

13. The resin composition as set forth in claim 1, wherein the thermoplastic resin (II) is one prepared by suspension polymerization or bulk polymerization.

14. The resin composition as set forth in claim 1, wherein the diene type rubber of the component (III) is a polybutadiene, butadiene/styrene copolymer or butadiene/acrylonitrile copolymer.

15. The resin composition as set forth in claim 1, wherein the component (III) is an ABS resin.

* * * * *